United States Patent
Schrager et al.

(10) Patent No.: US 11,616,814 B2
(45) Date of Patent: Mar. 28, 2023

(54) DATA PRIVACY IN SCREEN SHARING DURING A WEB CONFERENCE

(71) Applicant: THINKRITE, INC., Fort Lauderdale, FL (US)

(72) Inventors: Joshua P. Schrager, Miami, FL (US); Brenda Horowitz, Plantation, FL (US)

(73) Assignee: Thinkrite, Inc., Pembroke Pines, FL (US)

(*) Notice: Subject to any disclaimer, the term of this patent is extended or adjusted under 35 U.S.C. 154(b) by 360 days.

(21) Appl. No.: 16/589,005

(22) Filed: Sep. 30, 2019

(65) Prior Publication Data

US 2021/0099488 A1    Apr. 1, 2021

(51) Int. Cl.
   *H04L 9/40*        (2022.01)
   *G06F 3/04845*     (2022.01)
   *G06T 11/60*       (2006.01)
   *H04L 65/403*      (2022.01)

(52) U.S. Cl.
   CPC .......... *H04L 63/20* (2013.01); *G06F 3/04845* (2013.01); *G06T 11/60* (2013.01); *H04L 63/0428* (2013.01); *H04L 63/102* (2013.01); *H04L 65/403* (2013.01)

(58) Field of Classification Search
   CPC ... H04L 63/20; H04L 63/0428; H04L 63/102; H04L 65/403; G06F 3/4845; G06T 11/60
   USPC .......................................................... 726/1
   See application file for complete search history.

(56) References Cited

U.S. PATENT DOCUMENTS

| 10,347,293 | B1 | 7/2019 | Skinner et al. | |
| 11,405,587 | B1* | 8/2022 | Segal | G06F 3/04845 |
| 2003/0105820 | A1* | 6/2003 | Haims | G06Q 10/10 |
| | | | | 709/205 |
| 2013/0007895 | A1 | 1/2013 | Brolley et al. | |

(Continued)

FOREIGN PATENT DOCUMENTS

FR    3040576    3/2017

OTHER PUBLICATIONS

Authors et al. (Disclosed Anonymously), IP.com No. IPCOM000252373D, "Automatic Creation of Communication Channels Around Detected Events", pp. 1-36 (Year: 2018).*

(Continued)

*Primary Examiner* — Khalil Naghdali
(74) *Attorney, Agent, or Firm* — CRGO Global; Steven M. Greenberg

(57) ABSTRACT

Data privacy in screen sharing during Web conferencing includes selecting a third-party application executing in contemporaneously with a conferencing application. Screen sharing is activated during a Web conference in the conferencing application so as to share a display screen of the third-party application with different attendee computers over a computer communications network. An interface to the application is then queried with the attendees in order to receive access control data for the attendees. Then, a protected data field is identified in the display screen and determined whether one of the attendee computers is associated with one of several access control rules based upon the access control data that prohibits display of content in the protected data field. The data field is masked in the shared display screen for the one of the attendee computers while displaying remaining portions of the shared display screen in the one of the attendee computers.

20 Claims, 2 Drawing Sheets

(56) References Cited

U.S. PATENT DOCUMENTS

| | | | |
|---|---|---|---|
| 2015/0012270 A1* | 1/2015 | Reynolds | G11B 27/19 |
| | | | 704/233 |
| 2015/0302398 A1* | 10/2015 | Desai | G06Q 20/4014 |
| | | | 705/41 |
| 2016/0072831 A1* | 3/2016 | Rieke | H04L 43/045 |
| | | | 726/1 |
| 2018/0121663 A1 | 5/2018 | Hassan et al. | |
| 2018/0336373 A1 | 11/2018 | Deenadayal | |

OTHER PUBLICATIONS

Bruckman et al., The 2015 International Conference on Collaboration Technologies and Systems (CTS 2015), "Collaborative Content Creation", pp. 1-19 (Year: 2015).*

* cited by examiner

DATA PRIVACY IN SCREEN SHARING DURING A WEB CONFERENCE

BACKGROUND OF THE INVENTION

Field of the Invention

The present invention relates to the field of shared content in a shared presentation, and more particularly to screen sharing in a Web conference.

Description of the Related Art

An electronic meeting, hereinafter "e-meeting", in its broadest sense, is a collaboration between individuals that occurs electronically over a computer communications network. In a typical e-meeting, different individuals exchange messages through a computer interface to a common location. The most rudimentary form of an e-meeting is a discussion forum in which postings in a thread pertaining to a particular topic are provided serially in an asynchronous conversation. More advanced forms of an e-meeting provide for real-time exchanges of messages such as is the case in a chat room.

Of note, the modern e-meeting platform combines multiple different collaborative technologies to emulate a "real", "live", "in-person" conference, otherwise known as a Web conference. Within the context of a Web conference, those technologies include audio and video conferencing over the Internet, instant messaging and chat room, polling, white boarding and screen sharing. In respect to the latter, screen sharing permits a presenter to share display screens of a third-party application concurrently executing with a client user interface to the Web conference. Examples include a document processor such as a word processor, image viewer, document viewer, presentation processor and a Web browser. In many modern Web conferencing systems, the ability to screen share can be provided to each attendee to a Web conference such that when an attendee is made the "presenter", the attendee may then direct screen sharing of a third-party application executing concurrently with the user interface to the Web conference within the client computing device of the attendee granted presenter status.

Importantly, when screen sharing, an image of a display screen of the shared third-party application is created and then the image is transmitted to the attendees participating in the Web conference. The repeated creation and transmission of images to the attendees then provides the illusion that the attendees are viewing a live display of the shared third-party application. However, the continuous generation of imagery of a shared third-party application occurs without regard to the underlying content displayed in the display screen. In this regard, to the extent that confidential information is shown in the display screen, the confidential information will be shared with all attendees irrespective of the access rights of each of the attendees to access the confidential information. Worse, access control rules applicable for the shared third-party application will have been circumvented owing to the nature of screen sharing—capturing and transmitting images of the display screens of the screen shared third-party application.

BRIEF SUMMARY OF THE INVENTION

Embodiments of the present invention address deficiencies of the art in respect to screen sharing during video conferencing and provide a novel and non-obvious method, system and computer program product for data privacy in screen sharing for a Web conference In an embodiment of the invention, a method for data privacy in screen sharing for a Web conference includes selecting a third-party application executing in a presenter computing system contemporaneously with a conferencing application also executing in the presenter computing system. The method also includes activating screen sharing in the conferencing application sharing a display screen of the third-party application with different attendees by way of respectively different attendee computers over a computer communications network. The method yet further includes querying an access control interface of the third-party application for the attendees in order to receive access control data for the third-party application in respect to the attendees.

The method even yet further includes identifying a protected data field in the display screen and determining whether or not one of the attendee computers is associated with one of several access control rules based upon the received access control data that prohibits display of content in the protected data field, Finally, the method includes masking the protected data field in the shared display screen for any attendee computers that are prohibited from displaying the protected data field, while displaying remaining portions of the shared display screen in those attendee computers. Of note, the foregoing process may be performed during real-time Web conferencing, or in the alternative, during playback of a previously recorded Web conference. On playback, the access control interface of the third-party application is queried only for the attendees participating in the playback and in order to receive access control data for the third-party application in respect to the playback attendees.

In one aspect of the embodiment, the access control rule prohibits display of the protected data field based on certain characteristics of the attendees, such as when an attendee lacks credentials to access the third-party application as indicated by the access control data, or when any attendee computer is associated with an attendee of an organization different than the organization of the presenter associated with the presenter computing system, or when an attendee is credentialed to access the third party application according to the access control data, but is not authorized to view any data in the third-party application that the presenter is sharing, or when an attendee is not authorized to view certain data fields in the third-party application. In another aspect of the embodiment, the masking of the data field includes determining a location and dimension of the data field in the display screen, generating an image of the display screen, superimposing over the location in the generated image a graphical image of the dimension of the data field to mask the protected data field, and transmitting the masked image to the applicable attendee computers.

In even another aspect of the embodiment, the method further includes establishing a table in the conferencing application associating different fields of different specified third-party applications with different ones of the access control rules. To that end, the method additionally includes responding to a selection of a particular one of the specified third-party applications for screen sharing by retrieving from the table a corresponding one of the access control rules, identifying the protected data field in a display of the particular one of the specified third-party application, additionally identifying an attendee receiving the display in a corresponding one of the attendee computers, and applying the corresponding one of the access control rules to the protected data field in respect to the identified attendee.

In even yet another aspect of the embodiment, the method further includes displaying a prompt to the presenter during the Web conference indicating that one of several access control rules prohibits display of content in the protected data field. As well, responsive to a determination that one of the several access control rules prohibits display of the content in the protected data field during playback of the Web conference, the method includes muting audio of the Web conference for a duration of time during which the shared display screen is presented.

In another embodiment of the invention, a Web conferencing data processing system is configured for data privacy in screen sharing during Web conferencing. The system includes a host computing system of one or more computers, each with memory and at least one processor and a conferencing server executing in the memory of the host computing system and providing a Web conferencing session amongst different attendees over a computer communications network through a client interface in respectively different attendee computers. The system also includes a screen sharing module coupled to the conferencing server and including computer program instructions enabled during execution to respond to a request by a presenting one of the attendees to share a specific third-party application concurrently executing in a corresponding one of the attendee computers with the client interface. More specifically, the program instructions respond to the request by querying an access control interface of the third-party application for the different attendees in order to receive access control data for the third-party application in respect to the different attendees, by identifying a protected data field in a display screen of the specific third-party application and determining whether or not one of the attendee computers is associated with one of several access control rules based upon the received access control data that prohibits display of content in the protected data field and masking the data field in the display screen for the one of the attendee computers during sharing of the display screen while displaying remaining portions of the shared display screen in the one of the attendee computers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data privacy in screen sharing during Web conferencing. In accordance with an embodiment of the invention, a presenter in a Web conference selects through a user interface to a Web conferencing client user interface, a third-party application in connection with a directive to commence screen sharing with other attendees to the Web conference. Thereafter, an access control interface of the third-party application is queried for the attendees in order to receive access control data for the third-party application in respect to the attendees. As such, one or more data fields in a display screen of the third-party application are identified as being subject to access control indicated by the received access control data and a correspondent access control rule is applied to each of the attendees to the Web conference. Consequently, for each of the attendees prohibited from viewing the data fields according to the correspondent access control rule, an image of the display screen is modified to include a masking of each restricted one of the data fields before transmitting the image to each attendee subject to the prohibition. But, for others of the attendees not prohibited from viewing the data fields, an image of the display screen without masking is transmitted thereto.

Figure 1:
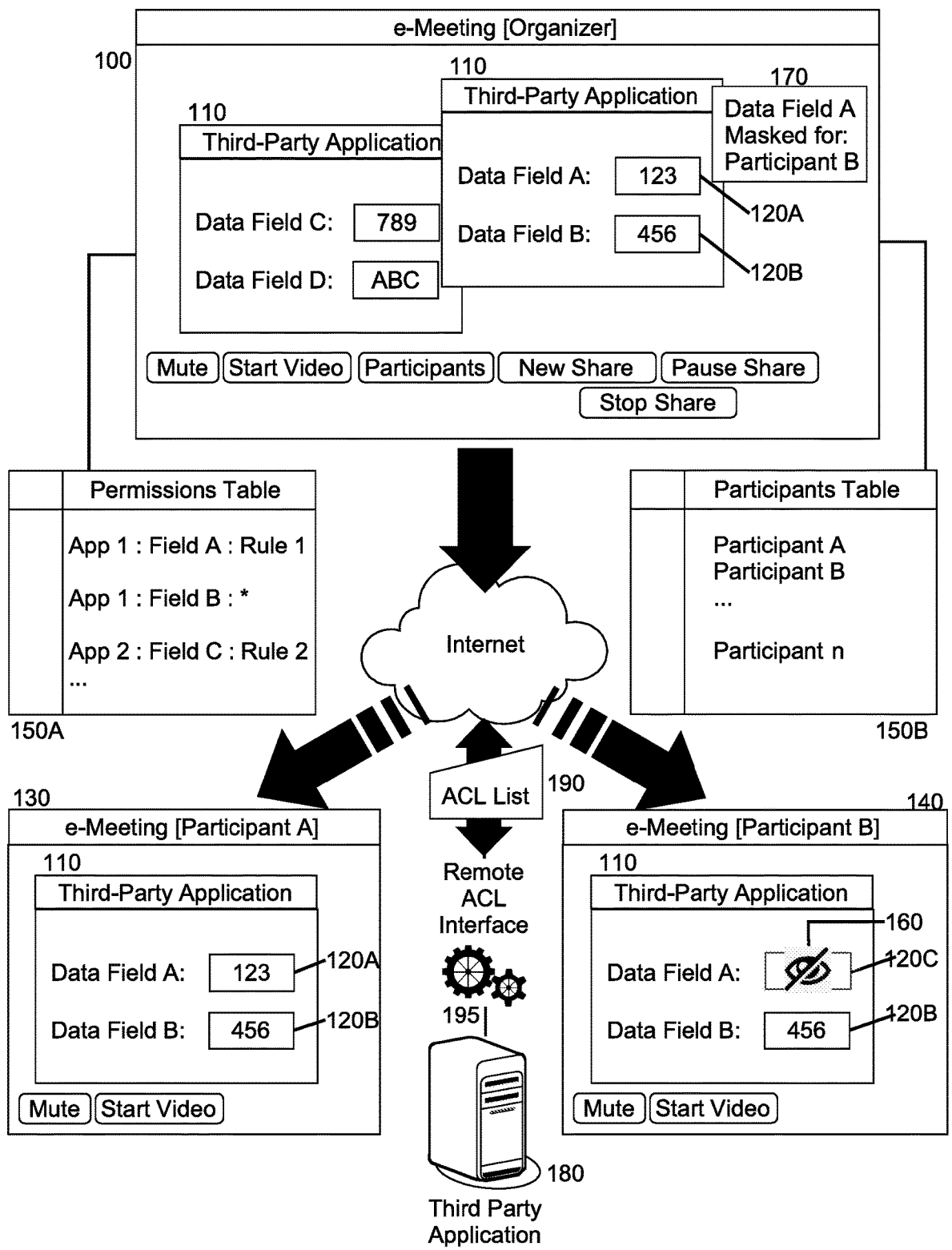
FIG. 1 is pictorial illustration of a process for data privacy in screen sharing during Web conferencing.

In further illustration, FIG. 1 pictorially shows a process for data privacy in screen sharing during Web conferencing. As shown in FIG. 1, a Web conference is established as between different participants over the Internet including an organizer who also acts as an initial presenter. Each of the participants views the Web conference through a respective e-meeting client 100, 130, 140 in which each of the presenters may control muting of audio, and the starting and stopping of video. As well, the organizer through respective user interface 100 may identify the participants, for instance by way of log-in information provided during a sign in process to the Web conference, by identifying a network address or client identifier of each of the participants as the participants connect to the Web conference, self-reported identity data by each of the participants, or caller identification for participants utilizing a telephonic interface to access an audio portion of the Web conference, to name a few examples. The participants are then added to a participants table 150B.

Finally, the organizer through respective user interface 100 may initiate screen sharing of a selected third-party application 110 that includes one or more data fields 120A, 120B of data. In response to a directive to share a view to the selected third-party application 110, a remote access control list interface 170 to the selected third-party application 110 may be queried to determine in response in an access control list 190, at the minimum, whether each one of the participants in the participants table 150B are registered users of the third-party application 180, and in a more complex embodiment, the access control role assigned to each of the participants in the participants table 150B. Thereafter, each of the e-meeting clients 130, 140 for each other respective one of the participants receives a continuously updating image of the selected third-party application 110.

However, importantly, during screen sharing of the selected third-party application 110, a permission table 150A is consulted to locate a screen sharing rule corresponding to the selected third-party application 110 and the role accorded to each of the participants in the participants table 150B as reported in the access control list 190 by the remote access control list interface 195. The rule determines which of the participants, or which type of the participant, are permitted to view the data in each individual one of the data fields 120A, 120B, or more generally, the data in any of the data fields 120A, 120B. For instance, the rule may specify in connection with the entirety of the selected third party application 110, or in connection with a specific one of the data fields 120A, 120B, or type of a specific one of the data fields 120A, 120B, whether or not a specific one of the participants is permitted to view the content of the all of the data fields 120A, 120B, a specific one of the data fields 120A, 120B, or generally speaking, none of the data fields 120A, 120B. A blanket form of the rule may determine that only participants registered as a user of the third-party application 180 may view the specific one of the data fields 120A, 120B, or as another example, only participants sharing a same organization as the presenter may view the specific one of the data fields 120A, 120B.

Upon determining that one of the participants corresponding to an e-meeting client is not permitted to view the content of a specific one of the data fields 120A, 120B, imagery of the selected third-party application 110 is provided to those of the participants determined to be permitted to view the content of the specific one of the data fields 120A, 120B such as corresponding to e-meeting client 130, but not to the one of the participants determined not permitted to view the content of the specific one of the data fields 120A, 120B corresponding to e-meeting client 140. In the latter circumstance, an image mask 160 is generated to sufficiently block viewing of the specific one of the data fields 120A, 120B by the one of the participants, the superimposition of the image mask 160 over the specific one of the data fields 120A, 120B producing a masked data field 120C.

For instance, the dimensions within the respective user interface 110 of the specific one of the data fields 120A, 120B is retrieved and the image mask 160 is created to meet those dimensions. Then, the image mask 160 is superimposed over a portion of the imagery of the selected third-party application 110 where the specific one of the data fields 120A, 120B is located and the composition of the image mask 160 and imagery is transmitted to the one of the participants determined not to be permitted to view the content of the specific one of the data fields 120A, 120B. Optionally, a prompt 170 is presented in connection with the specific one of the data fields 120A, 120B in the respective user interface 100 of the organizer indicating an identify of a specific one or more of the participants determined not to be permitted to view the content of the specific one of the data fields 120A, 120B.

In this way, data privacy can be imparted upon the selected third-party application 110 even though in a screen sharing mode, only imagery of the selected third-party application 110 is provided to the participants by a different application—the e-meeting client. As well, no access or control to the selected third-party application 110 exists within the e-meeting client so as to limit the display of the content of the specific data fields 120A, 120B during screen sharing. Thus, only by superimposing the image mask 160 before transmission of the screen shared imagery can data privacy be enforced in respect to the screen sharing of the selected third-party application 110.

Figure 2:
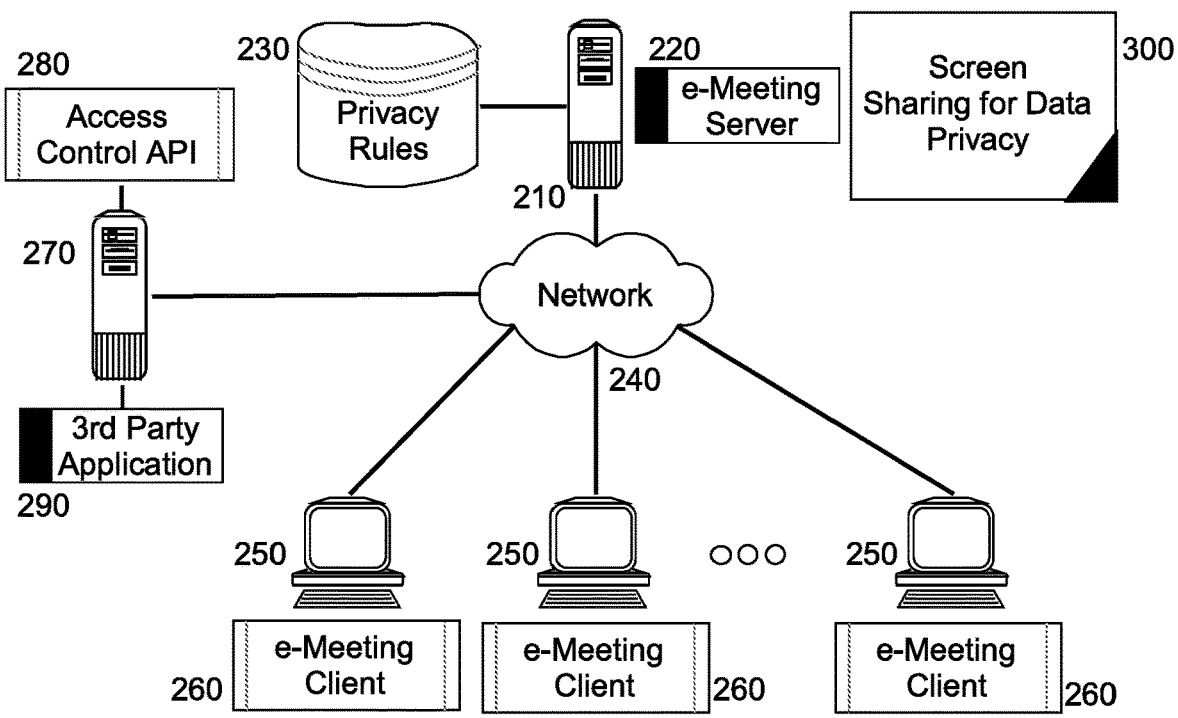
FIG. 2 is a schematic illustration of a Web conferencing data processing system adapted for data privacy in screen sharing during Web conferencing; and, FIG. 3 is a flow chart illustrating a process for data privacy in screen sharing during Web conferencing.

The process described in connection with FIG. 1 may be implemented within a Web conferencing data processing system. In further illustration, FIG. 2 schematically shows a Web conferencing data processing system adapted for data privacy in screen sharing during Web conferencing. The system includes a host computing system 210 that includes one or more computers, each with memory and at least one processor. The host computing system 210 is communicatively coupled to different computing clients 250 over computer communications network 240, for instance the global Internet. Of note, e-meeting server 220 executes in the memory of the host computing system 210 and establish a Web conference amongst different participants through different e-meeting clients 260 each disposed within a corresponding one of the computing clients 250.

The host computing system 210 additionally supports the presentation in a display thereof of a user interface to a third-party application 290, remotely executing in a remote server 270 and accessible by the host computing system 220 over the computer communications network 240. The third-party application 290 provides an access control application programming interface (API) 280 through which access control data is provided in respect to the third-party application 290 to querying programmatic logic. In this regard, the API 280 can receive as little as an identifier of an end user from the querying programmatic logic in response to which the API 280 can return access control data indicating at the minimum, whether or not the identified end user is a registered user of the third-party application 290, and in more complex embodiments, the role of the identified end user, specific modules or screens of the third-party application 290 which the identified end user is permitted or prohibited from viewing, or even specific data fields of the third-party application 290 which the identified end user is permitted or prohibited from viewing.

Notably, a screen sharing module 300 is coupled to the e-meeting server 220. The screen sharing module 300 includes computer program instructions enabled during execution in the host computing system 210 to perform screen sharing of a selected application such as the third-party application 290. The instructions further are enabled to respond to the selection of the third-party application 290 for screen sharing by querying the access control API 280 for access control data for each of the attendees to the established Web conference. If applicable, the program instructions prompt the attendee to enter credentials to establish permission to view the protected data field. The program instructions yet further are enabled to locate in a data store of privacy rules 230, a privacy rule corresponding to the third-party application 290 selected for sharing by a presenting one of the participants in the established Web conference. The program instructions are further enabled to determine, for each one of the participants directed to receive imagery of the third-party application 290 selected for screen sharing, whether or not the rule permits or prohibits access to one or more data fields in the third-party application based upon the access control data supplied by the access control API 280 of the third-party application 290.

The program instructions yet further are enabled to generate an image mask sufficient to block viewing of each data field determined to be inaccessible for one or more of the participants by application of the located rule, and to superimpose the image mask upon each of those determined fields to create a composite image suitable for sharing with the one or more of the participants. Finally, the program instructions are enabled to transmit to the one or more of the participants, the composite image for viewing in respective ones of the e-meeting clients 260 and to notify the presenter if the rule has prohibited access to one or more data fields in the third-party application.

Optionally, to the extent that the Web conference is recorded for subsequent playback, audio recorded in connection with the shared display screen including the protected data field is muted on playback for any participant viewing the playback of the Web conference for whom the application of the located rule requires the masking of the protected field. In this way, to the extent the muted audio includes an audible discussion of the protected content, the participant will be prohibited from hearing the audible discussion. The muting of the audio can continue for the duration of the display of shared display screen with the protected field.

Figure 3:
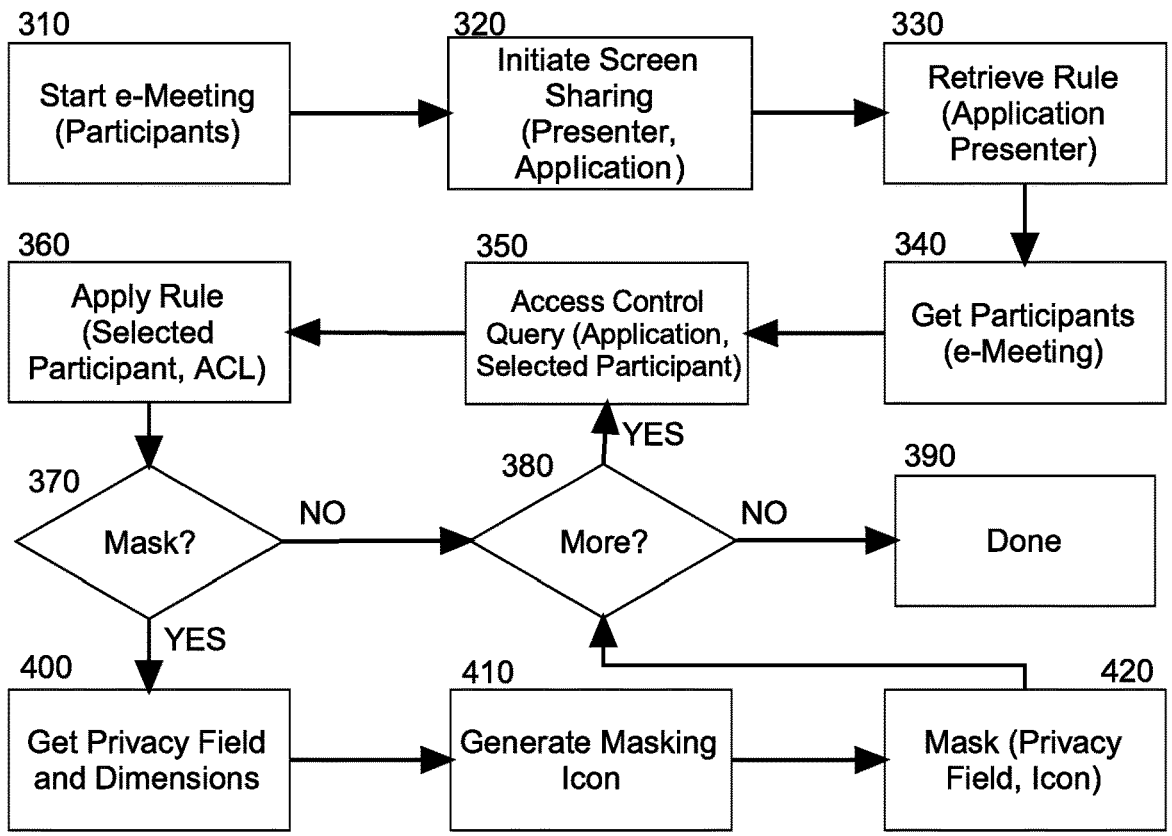

In even yet further illustration of the operation of the screen sharing module 300, FIG. 3 is a flow chart illustrating a process for data privacy in screen sharing during Web conferencing. Beginning in block 310, a Web conference is established for a set of participants and in block 320, a directive to initiate screen sharing with respect to a specific third-party application by a particular presenter one of the participants also is received. In block 330, a rule is retrieved for the specific third-party application and the presenter and in block 340, a list of the participants to the Web conference is retrieved. In block 350, one of the participants in the list is selected and an access control API of the third-party application is queried with a selected one of the participants to retrieve access control data for the selected one of the participants. In block 360, the retrieved rule is applied to the selected participant with respect to access control data received from the access control API for the selected one of the participants. In decision block 370, if the application of the rule does not require a masked portion of a data field in the specific third-party application, an image of the third-party application may be transmitted to the selected participant. Then, in decision block 380 it is determined if additional participants remain to be considered. If so, the process returns to the block 350 with the selection of a next one of the participants to whom the retrieved rule is applied in block 360.

In decision block 370, if the application of the rule requires a masked portion of a data field in the specific third-party application, then in block 400, the dimensions of the data field are retrieved and in block 410, an image mask is generated according to the same dimensions. Thereafter, in block 420, the image mask is superimposed upon an image of the specific third-party application and the composition of the image mask may then be transmitted to the selected participant during screen sharing of the third-party application and the presenter is notified. In decision block 380, if no additional participants remain to be processed, the process ends in block 390 such that the composition of image mask superimposed upon the data field of the image of the specific third-party application is transmitted during screen sharing to those of the participants determined by the retrieved rule as not being permitted to view the content of the data field.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for data privacy in screen sharing during Web conferencing, the method comprising:
    selecting during a Web conference a third-party application executing in a presenter computing system contemporaneously with a conferencing application also executing in the presenter computing system;
    activating screen sharing in the conferencing application sharing a display screen of the third-party application with different attendees by way of respectively different attendee computers over a computer communications network;
    querying an access control list interface of the third-party application for the attendees in order to receive access control data for the third-party application in respect to the attendees, and receiving in response to the querying from the access control list interface of the third-party application, access control data indicating whether each one of attendees are registered users of the third-party application and identifying one or more data fields of the display screen of the third-party application subject to access control;
    identifying a protected one of the data fields in the display screen indicated by the access control data and determining whether or not one of the attendee computers is associated with one of several access control rules based upon the received access control data that prohibits display of content in the protected one of the data fields; and,
    masking the protected one of the data fields in the shared display screen for the one of the attendee computers while displaying remaining portions of the shared display screen in the one of the attendee computers, and the shared display screen without any masking for others of the attendee computers as permitted by the access control data.

2. The method of claim 1, wherein the access control rule prohibits display of the protected data field in any attendee computer of an attendee lacking credentials to access the third-party application as indicated by the access control data.

3. The method of claim 1, wherein the masking of the data field comprises determining a location and dimension of the data field in the display screen, generating an image of the display screen, superimposing over the location in the generated image a graphical image of the dimension of the data field, and transmitting the image to the one of the attendee computers.

4. The method of claim 1, further comprising:
    establishing a table in the conferencing application associating different fields of different specified third-party applications with different ones of the access control rules; and,
    responding to a selection of a particular one of the specified third-party applications for screen sharing by retrieving from the table a corresponding one of the access control rules, identifying the protected data field in a display of the particular one of the specified third-party application, additionally identifying an attendee receiving the display in a corresponding one of the attendee computers, and applying the corresponding one of the access control rules to the protected data field in respect to the identified attendee.

5. The method of claim 1, further comprising generating a prompt during a Web conference in the conferencing application indicating a prohibition on sharing of the content in the protected data field in the one of the attendee computers, the prompt identifying ones of the attendee computers receiving the masked data field in the shared display screen.

6. The method of claim 1, further comprising muting audio when sharing the shared display screen during playback of a recorded form of the Web conference to a playback attendee determined to be associated with one of several access control rules that prohibits display of content in the protected data field.

7. A Web conferencing data processing system configured for data privacy in screen sharing during Web conferencing, the system comprising:
    a host computing system comprising one or more computers, each with memory and at least one processor;
    a conferencing server executing in the memory of the host computing system and providing a Web conferencing session amongst different attendees over a computer communications network through a client interface in respectively different attendee computers;
    a screen sharing module coupled to the conferencing server, the module comprising computer program instructions enabled during execution to respond to a request during a Web conference by a presenter one of the attendees to share a specific third-party application concurrently executing in a corresponding one of the attendee computers with the client interface by:
    querying an access control list interface of the third-party application for the attendees in order to receive access control data for the third-party application in respect to the attendees, and receiving in response to the querying from the access control list interface of the third-party application, access control data indicating whether each one of attendees are registered users of the third-party application and identifying one or more data fields of the display screen of the third-party application subject to access control;

identifying a protected one of the data fields in the display screen indicated by the access control data and determining whether or not one of the attendee computers is associated with one of several access control rules based upon the received access control data that prohibits display of content in the protected one of the data fields; and, masking the protected one of the data fields in the shared display screen for the one of the attendee computers while displaying remaining portions of the shared display screen in the one of the attendee computers, and the shared display screen without any masking for others of the attendee computers as permitted by the access control data.

8. The system of claim 7, wherein the program instructions execute in the memory of the host computing system.

9. The system of claim 7, wherein the program instructions execute in memory of the corresponding one of the attendee computers.

10. The system of claim 7, wherein the access control rule prohibits display of the protected data field in any attendee computer of an attendee lacking credentials to access the third-party application as indicated by the access control data.

11. The system of claim 7, wherein the masking of the data field comprises determining a location and dimension of the data field in the display screen, generating an image of the display screen, superimposing over the location in the generated image a graphical image of the dimension of the data field, and transmitting the image to the one of the attendee computers.

12. The system of claim 7, wherein the program instructions further perform:

establishing a table in the conferencing application associating different fields of different specified third-party applications with different ones of the access control rules; and, responding to a selection of a particular one of the specified third-party applications for screen sharing by retrieving from the table a corresponding one of the access control rules, identifying the protected data field in a display of the particular one of the specified third-party application, additionally identifying an attendee receiving the display in a corresponding one of the attendee computers, and applying the corresponding one of the access control rules to the protected data field in respect to the identified attendee.

13. The system of claim 12, wherein the program instructions further perform generating a prompt during a Web conference in the conferencing application indicating a prohibition on sharing of the content in the protected data field in the one of the attendee computers, the prompt identifying ones of the attendee computers receiving the masked data field in the shared display screen.

14. The system of claim 12, wherein the program instructions further perform muting audio when sharing the shared display screen during playback of a recorded form of the Web conference to a playback attendee determined to be associated with one of several access control rules that prohibits display of content in the protected data field.

15. A computer program product for data privacy in screen sharing during Web conferencing, the computer program product including a computer readable storage medium having program instructions embodied therewith, the program instructions executable by a device to cause the device to perform a method including:

selecting during a Web conference a third-party application executing in a presenter computing system contemporaneously with a conferencing application also executing in the presenter computing system;

activating screen sharing in the conferencing application sharing a display screen of the third-party application with different attendees by way of respectively different attendee computers over a computer communications network;

querying an access control list interface of the third-party application for the attendees in order to receive access control data for the third-party application in respect to the attendees, and receiving in response to the querying from the access control list interface of the third-party application, access control data indicating whether each one of attendees are registered users of the third-party application and identifying one or more data fields of the display screen of the third-party application subject to access control;

identifying a protected one of the data fields in the display screen indicated by the access control data and determining whether or not one of the attendee computers is associated with one of several access control rules based upon the received access control data that prohibits display of content in the protected one of the data fields; and, masking the protected one of the data fields in the shared display screen for the one of the attendee computers while displaying remaining portions of the shared display screen in the one of the attendee computers, and the shared display screen without any masking for others of the attendee computers as permitted by the access control data.

16. The computer program product of claim 15, wherein the access control rule prohibits display of the protected data field in any attendee computer of an attendee lacking credentials to access the third-party application as indicated by the access control data.

17. The computer program product of claim 15, wherein the masking of the data field comprises determining a location and dimension of the data field in the display screen, generating an image of the display screen, superimposing over the location in the generated image a graphical image of the dimension of the data field, and transmitting the image to the one of the attendee computers.

18. The computer program product of claim 15, wherein the method further comprises:

establishing a table in the conferencing application associating different fields of different specified third-party applications with different ones of the access control rules; and, responding to a selection of a particular one of the specified third-party applications for screen sharing by retrieving from the table a corresponding one of the access control rules, identifying the protected data field in a display of the particular one of the specified third-party application, additionally identifying an attendee receiving the display in a corresponding one of the attendee computers, and applying the corresponding one of the access control rules to the protected data field in respect to the identified attendee.

19. The computer program product of claim 15, wherein the method further comprises generating a prompt during a Web conference in the conferencing application indicating a prohibition on sharing of the content in the protected data field in the one of the attendee computers, the prompt identifying ones of the attendee computers receiving the masked data field in the shared display screen.

20. The computer program product of claim 15, wherein the method further comprises muting audio when sharing the shared display screen during playback of a recorded form of the Web conference to a playback attendee determined to be associated with one of several access control rules that prohibits display of content in the protected data field.

* * * * *